United States Patent
Koreeda et al.

(10) Patent No.: US 7,329,051 B2
(45) Date of Patent: Feb. 12, 2008

(54) OPTICAL CONNECTOR APPARATUS SUITABLE FOR INTERCONNECTION BETWEEN DIFFERENT-DIAMETER FERRULES

(75) Inventors: Yuichi Koreeda, Tokyo (JP); Akihiro Onogawa, Tokyo (JP); Hideto Shimazu, Tokyo (JP); Kan Ozawa, Tokyo (JP); Go Kaneko, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/705,630

(22) Filed: Feb. 13, 2007

(65) Prior Publication Data

US 2007/0190834 A1    Aug. 16, 2007

(30) Foreign Application Priority Data

Feb. 14, 2006   (JP)   ............................. 2006-036982

(51) Int. Cl.
G02B 6/38   (2006.01)
(52) U.S. Cl. ....................................... 385/55
(58) Field of Classification Search ............ 385/55–56, 385/139
See application file for complete search history.

(56) References Cited

U.S. PATENT DOCUMENTS 6,102,581 A * 8/2000 Deveau et al. ................. 385/56

2004/0033028 A1 * 2/2004 Cheng ........................... 385/55

FOREIGN PATENT DOCUMENTS

JP    5-88043 A    4/1993
JP    2001-194554 A    7/2001

* cited by examiner

Primary Examiner—Michelle Connelly-Cushwa
Assistant Examiner—Chris H. Chu
(74) Attorney, Agent, or Firm—Frishauf, Holtz, Goodman & Chick, P.C.

(57) ABSTRACT

An optical connector apparatus includes a first connector having a first connecting portion adapted to be connected to and disconnected from a first connecting object in a first direction, a second connector which has a second connecting portion adapted to be connected to a second connection object and which is coupled to the first connector, and an optical fiber connected between the first and the second connectors. The first connector includes a first ferrule having an end portion formed at a position corresponding to the first connecting portion and having a first outer diameter. The second connector includes a second ferrule having an end portion formed at a position corresponding to the second connecting portion and having a second outer diameter greater than the first outer diameter. The optical fiber is coupled to the first and the second ferrules.

9 Claims, 4 Drawing Sheets

OPTICAL CONNECTOR APPARATUS SUITABLE FOR INTERCONNECTION BETWEEN DIFFERENT-DIAMETER FERRULES

This application claims priority to prior Japanese patent application JP 2006-36982, the disclosure of which is incorporated herein by reference.

BACKGROUND OF THE INVENTION

This invention relates to an optical connector apparatus and, in particular, to an optical connector apparatus capable of interconnecting different connectors having ferrules different in diameter.

As an interface of a SFF (Small Form Factor) transceiver in an optical communication field, use is widely made of a LC connector and a SC connector. The LC and the SC connectors have ferrules different in diameter from each other. Therefore, in order to connect those different connectors, so-called conversion in diameter is required.

For example, Japanese Unexamined Patent Application Publication (JP-A) No. 2001-194554 discloses a conversion sleeve capable of holding different-diameter ferrules with a predetermined force. Specifically, a SC connector and a LC connector are connected to each other via a LC-SC conversion adapter using a conversion sleeve. However, the number of parts is increased and a connecting operation is troublesome. Furthermore, a connection structure inevitably has a large scale. Therefore, it is often difficult to use the conversion sleeve in a narrow occupation space.

Japanese Unexamined Patent Application Publication (JP-A) No. H5-88043 discloses use of an optical connection adapter for ferrule-diameter conversion. In case where the optical connection adapter of the type is used, two optical center axes can not be aligned at an interface of a two-contact LC connector. Therefore, the optical center axes are displaced and aligned and then connected to a SC connector. However, because a troublesome work of displacing and aligning the optical center axes at the interface of the two-pin LC connector is required, connection requires much time and labor. In addition, it is difficult to simply and properly connect these connectors.

SUMMARY OF THE INVENTION

It is therefore an object of this invention to provide an optical connector apparatus having a simple structure and capable of stably and properly connect different connectors having ferrules different in diameter by easy conversion in diameter.

Other objects of the present invention become clear as the description proceeds.

According to an aspect of the present invention, there is provided an optical connector apparatus comprising a first connector having a first connecting portion adapted to be connected to and disconnected from a first connecting object in a first direction, a second connector which has a second connecting portion adapted to be connected to a second connection object and which is coupled to the first connector, and an optical fiber connected between the first and the second connectors, wherein the first connector includes a first ferrule having an end portion formed at a position corresponding to the first connecting portion and having a first outer diameter, wherein the second connector includes a second ferrule having an end portion formed at a position corresponding to the second connecting portion and having a second outer diameter greater than the first outer diameter, and wherein the optical fiber is coupled to the first and the second ferrules.

DESCRIPTION OF THE PREFERRED EMBODIMENT

Figure 1A:
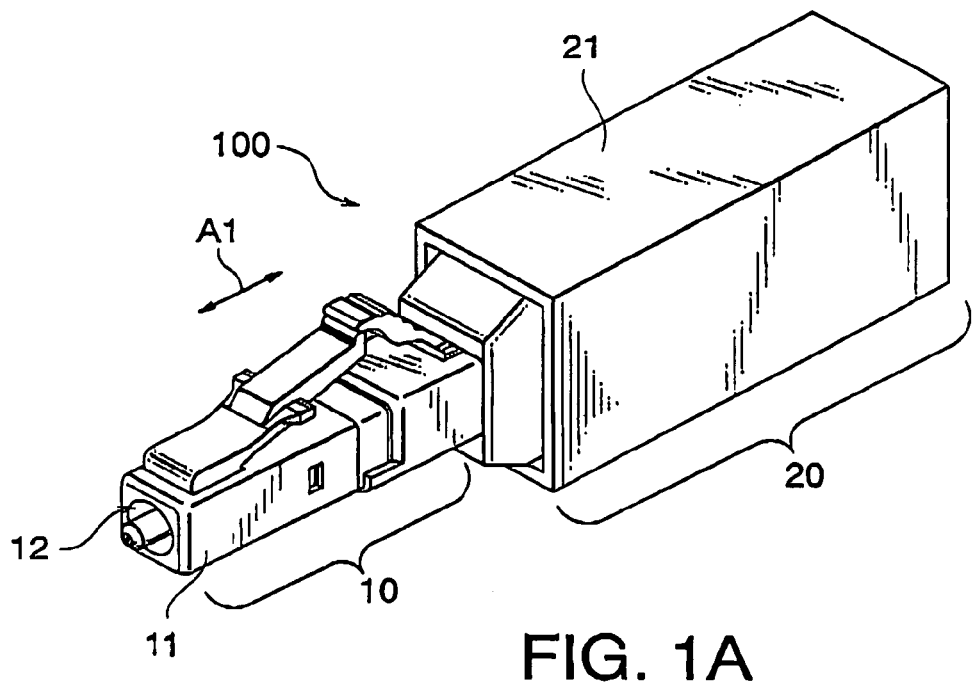
FIG. 1A is an external perspective view of an optical connector apparatus according to a first embodiment of this invention.
Figure 1B:
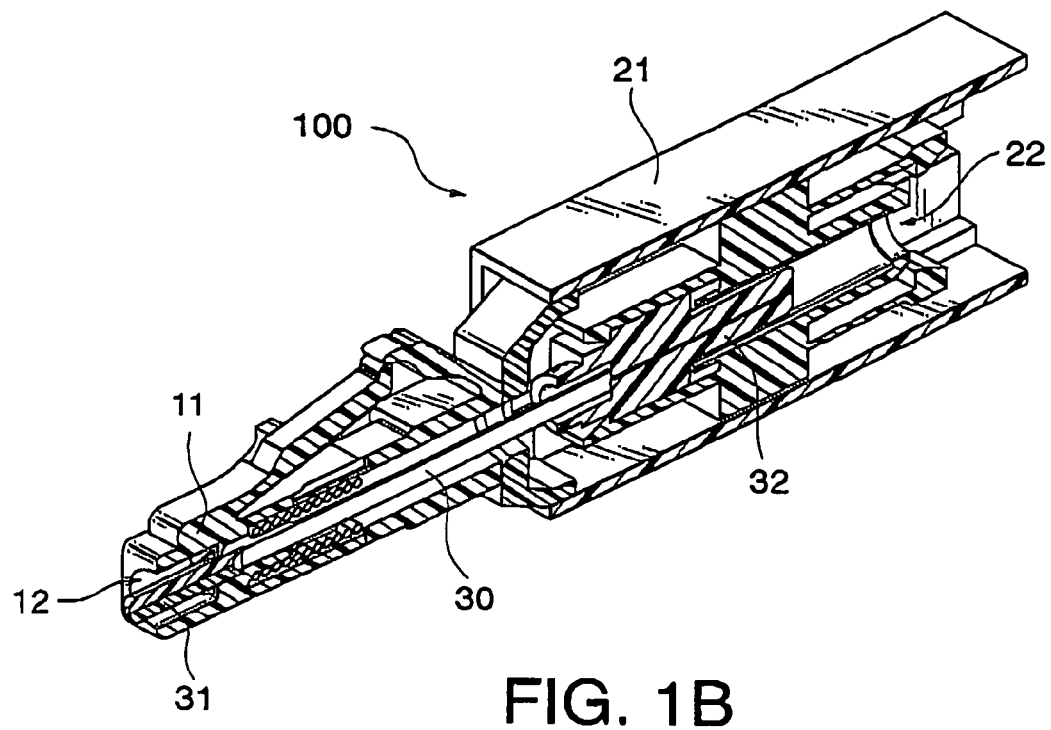
FIG. 1B is a longitudinal sectional perspective view of FIG. 1A.
Figure 2:
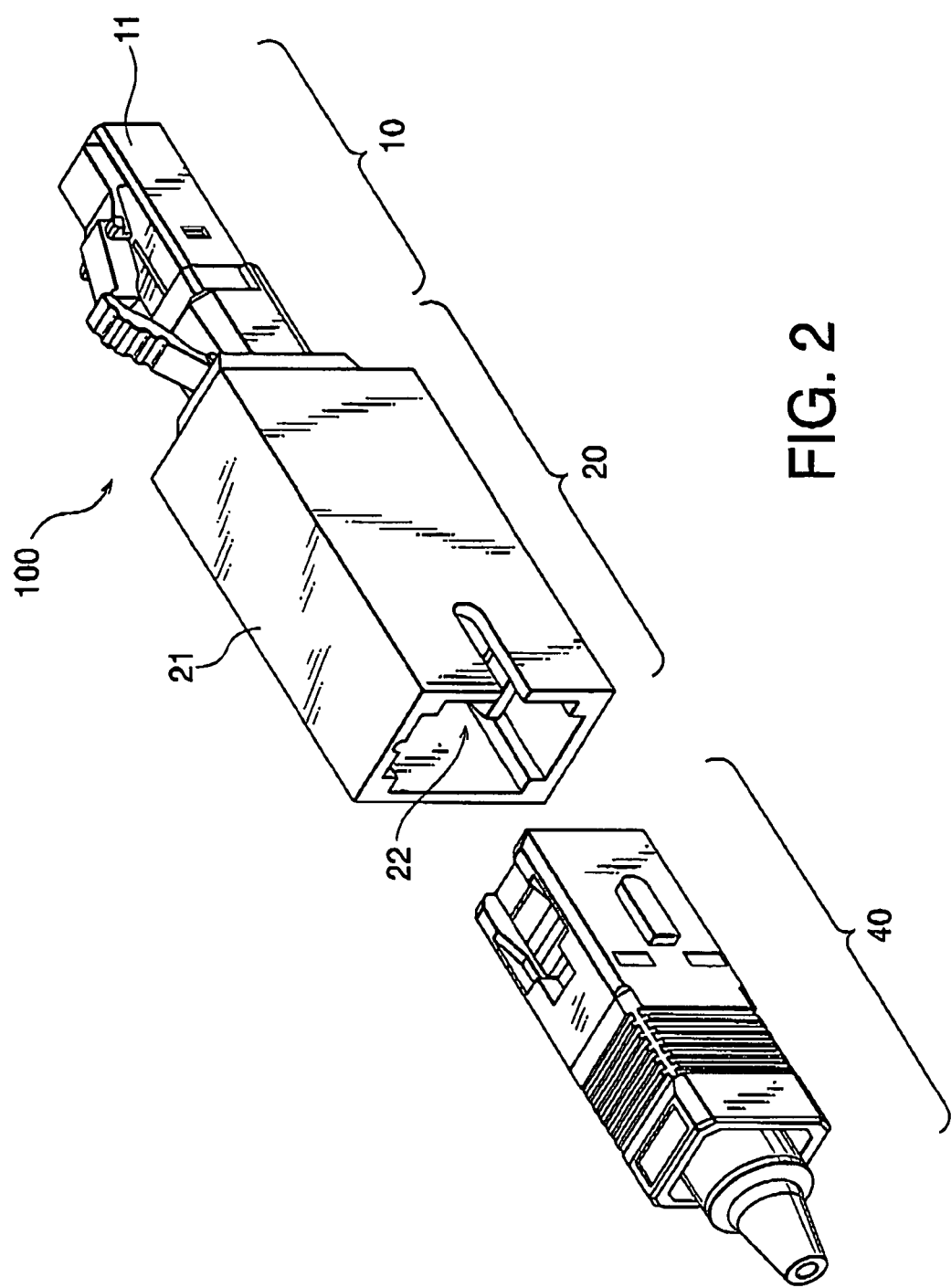
FIG. 2 is an external perspective view of the optical connector apparatus illustrated in FIGS. 1A and 1B together with a mating connector.
Figure 3:
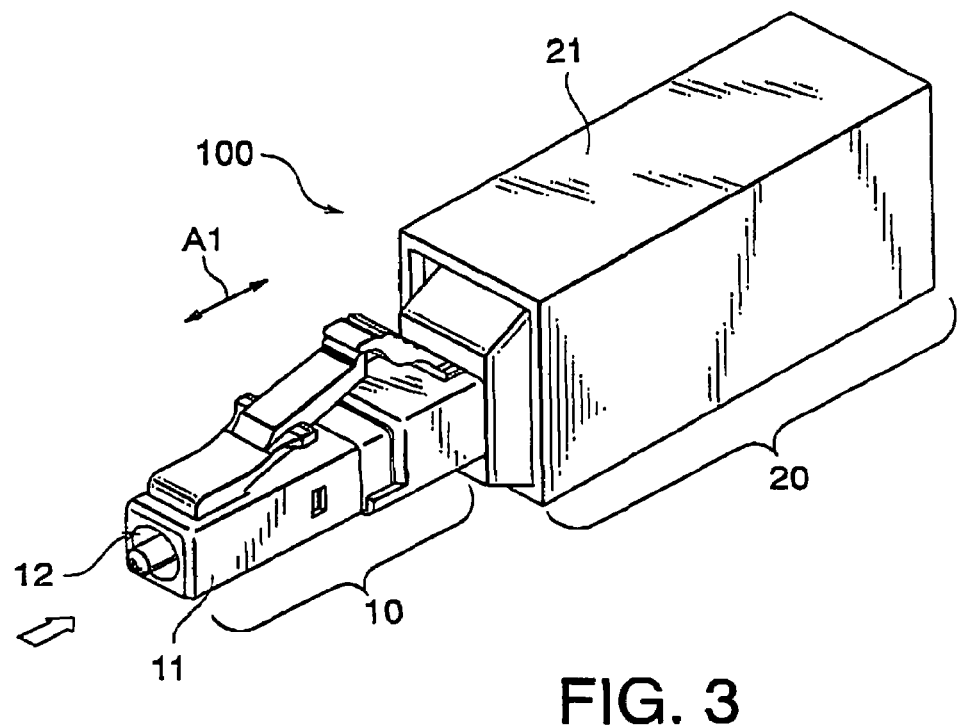
FIG. 3 is an external perspective view of the optical connector apparatus in FIG. 1 in a deformed state.

Referring to FIGS. 1A to 3, description will be made of an optical connector apparatus according to a first embodiment of this invention.

The optical connector apparatus depicted at 100 comprises first and second ferrules 31 and 32 fixedly holding opposite ends of an optical fiber 30 of a predetermined length, and first and second housings 11 and 21 holding the first and the second ferrules 31 and 32, respectively.

The first housing 11 has a first connecting portion 12 holding the first ferrule 31 and adapted to be connected to a first connecting object (not shown). Thus, a plug connector 10 as a first connector is formed. On the other hand, the second housing 21 has a second connecting portion 22 holding the second ferrule 32 and adapted to be connected to a mating connector 40 as a second connecting object. Thus, an adapter connector 20 as a second connector is formed. The plug connector 10 is slidable with respect to the adapter connector 20 in a connecting/disconnecting direction A1 (first direction) in which the plug connector 10 is connected to and disconnected from the first connecting object. Specifically, the second housing 21 is formed into a cylindrical shape and the first housing 11 is slidably fitted inside the second housing 21.

The first ferrule 31 has a connecting outer diameter of 1.25 mm. The second ferrule 32 has a connecting outer diameter of 2.5 mm greater than that of the first ferrule 31. Herein, the connecting outer diameter of the first ferrule 31 is an outer diameter of an end portion at a position corresponding to the first connecting portion 12. The connecting outer diameter of the second ferrule 32 is an outer diameter of an end portion at a position corresponding to the second connecting portion 22.

As described above, the first and the second ferrules 31 and 32 different in connecting outer diameter are held by the first and the second housings 11 and 22 as separate structures fitted to each other. Further, a part of the plug connector 10 is inserted into a part of the adapter connector 20. In addition, when the first connecting object to be connected to the plug connector 10 is connected on the side of the first connecting portion 12, a portion of the optical fiber 30 between the first and the second ferrules 31 and 32 is bent.

Therefore, even if different connectors having different-diameter ferrules, for example, an LC connector and a SC connector are connected to each other, connection is stably and properly achieved by easy conversion in diameter without requiring large-scale assembling.

For example, it is assumed that the first connecting object to be connected to the plug connector is an LC connector while the second connecting object (mating connector 40) to be connected to the adapter connector 20 is an SC connector. In this case, the SC connector and the adapter connector 20 are connected on the side of the second connecting portion 22 while the LC connector and the plug connector 10 are connected on the side of the first connecting portion 12. At this time, as depicted by a white arrow in FIG. 3, the plug connector 10 slightly slides and moves inward the adapter connector 20. Then, the portion of the optical fiber 30 between the first and the second ferrules 31 and 32 is bent. Thus, when first connecting object is connected, the first ferrule 31 is pushed by the first connecting object and moved so that the optical fiber 30 is bent. Thereafter, when the plug connector 10 slightly slides and moves back outward the adapter connector 20, the optical fiber 30 is extended straight.

With the above-mentioned structure, it is possible to easily and properly perform connection even at an interface of a two-pin LC connector without requiring a troublesome operation of displacing and aligning optical center axes at the interface of the two-pin LC connector. In the foregoing description, the plug connector 10 is slidable. Alternatively, the plug connector 10 may be fixed to the adapter connector 20 to be unslidable.

Figure 4:
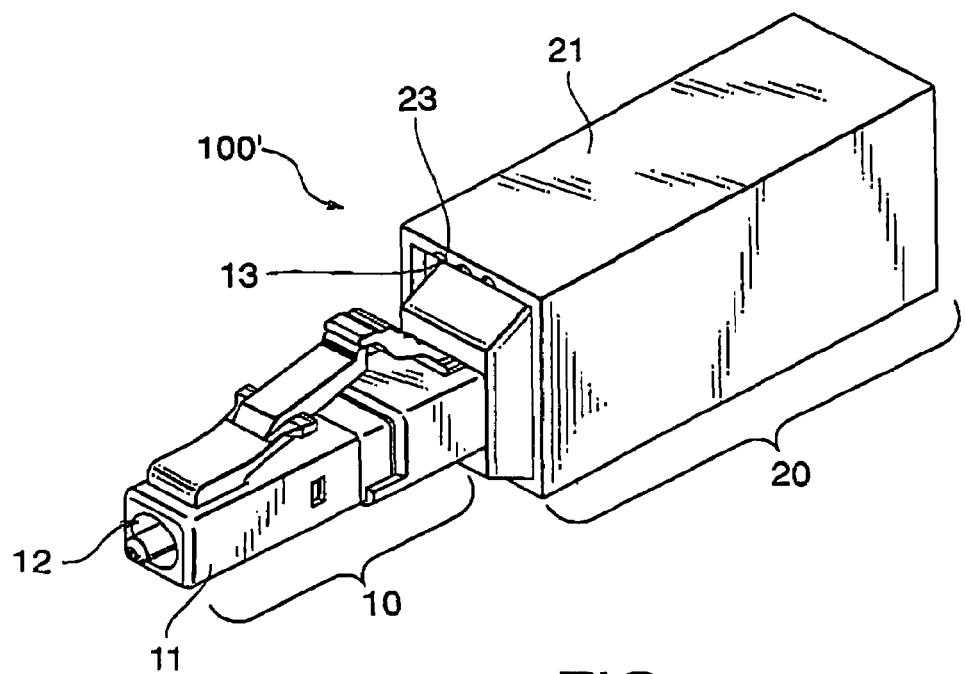
FIG. 4 is a perspective view of an optical connector apparatus according to a second embodiment of this invention.
Figure 5:
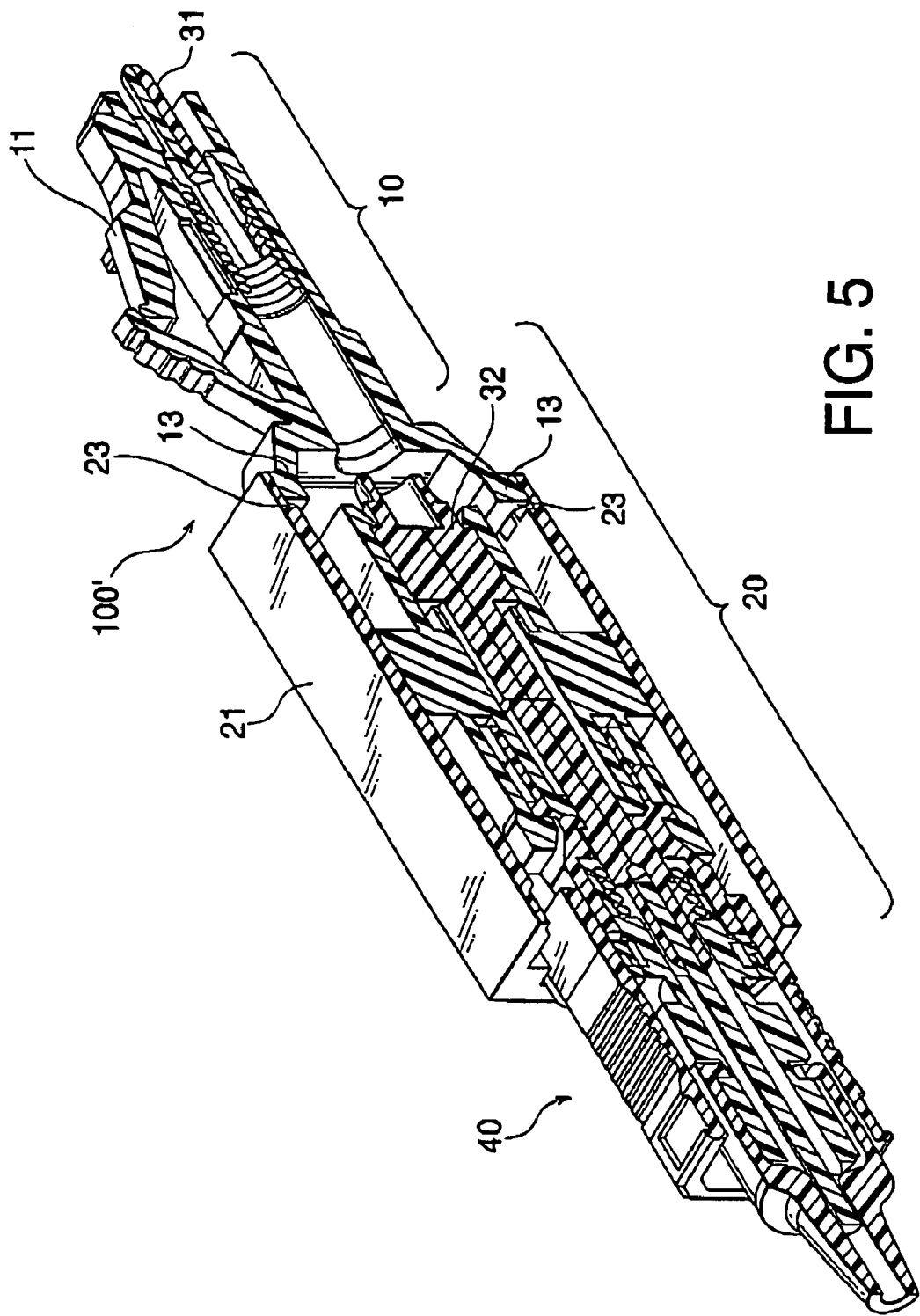
FIG. 5 is a vertical sectional side view of the optical connector apparatus in FIG. 4 when it is coupled to a mating connector.

Referring to FIGS. 4 and 5, the description will be made of an optical connector apparatus according to a second embodiment of this invention. In the optical connector apparatus depicted at 100', similar parts are designated by like reference numerals and description thereof will be omitted.

The optical connector apparatus 100' has a structure for smoothly operating a sliding function between the plug connector 10 and the adapter connector 20. Specifically, the plug connector 10 has a pair of protruding portions 13 formed on the first housing 11 at a portion opposite to the first connecting portion 12 (over a required range) and adapted to be slidably inserted into the adapter connector 20. The protruding portions 13 protrude radially outward and extend in the connecting/disconnecting direction A1. On the other hand, the adapter connector 20 has a pair of recessed portions 23 formed on the second housing 21 at a portion opposite to the second connecting portion 22 (over a required range) and adapted to receive the plug connector 10 slidably inserted therein. The recessed portions 23 extend in the connecting/disconnecting direction A1 and serve to receive and guide the protruding portions 13, respectively.

Like the optical connector apparatus 100 mentioned above, the optical connector apparatus 100' is capable of stably and properly achieve connection by easy conversion in diameter even for the LC connector and the SC connector. In addition, sliding movement of the plug connector 10 with respect to the adapter connector 20 when the LC connector and the plug connector 10 are connected on the side of the first connecting portion 12 is smoothly performed by the recessed portions 23 guiding the protruding portions 13. Thus, a combination of the protruding portions 13 and the recessed portions 23 serves as a guide for guiding sliding movement of the plug connector 10.

By engagement between the protruding portions 13 and end walls of the recessed portions 23 in the connecting/disconnecting direction A1, a movable region of the plug connector 10 can be restricted. In this case, the end walls of the recessed portions 23 serve as a restricting portion. Therefore, as compared with the optical connector apparatus 100 in the first embodiment, the LC connector can be connected more accurately and properly.

In the optical connector apparatus of FIGS. 4 and 5, the second ferrule 32 may slide and move when the mating connector 40 is connected. Alternatively, the first ferrule 31 may be fixed to the first housing 11 without sliding movement.

While the present invention has thus far been described in connection with the preferred embodiments thereof, it will readily be possible for those skilled in the art to put this invention into practice in various other manners. For example, each of the above-mentioned optical connector apparatuses is applicable not only to connection of the different connectors, such as the LC connector and the SC connector, but also to the field of an optical measuring instrument by utilizing a diameter conversion optical connector function.

What is claimed is:

1. An optical connector apparatus comprising:
   a first connector having a first connecting portion adapted to be connected to and disconnected from a first connection object in a first direction;
   a second connector which has a second connecting portion adapted to be connected to a second connection object, and which is coupled to the first connector; and
   an optical fiber connected between the first and the second connectors;
   wherein the first connector includes a first ferrule having an end portion formed at a position corresponding to the first connecting portion and having a first outer diameter;
   wherein the second connector includes a second ferrule having an end portion formed at a position corresponding to the second connecting portion and having a second outer diameter greater than the first outer diameter;
   wherein the optical fiber is coupled to the first ferrule and the second ferrule; and
   wherein the first connector is held by the second connector to be slidable in the first direction.

2. The optical connector apparatus according to claim 1, wherein the optical fiber has opposite ends fixed to the first and the second ferrules, respectively, so that the optical fiber has a portion to be extended straight and bent in response to sliding movement of the first connector.

3. The optical connector apparatus according to claim 1, further comprising a guide formed between the first and the second connectors to guide sliding movement of the first connector.

4. The optical connector apparatus according to claim 3, wherein the guide comprises:
   a protruding portion which is formed on one of the first and the second connectors; and
   a recessed portion which is formed on the other of the first and the second connectors, and which extends in the first direction and receives the protruding portion.

5. The optical connector apparatus according to claim 3, wherein the guide further comprises a restricting portion for restricting a movable region of the first connector.

6. The optical connector apparatus according to claim 1, wherein the first connector further comprises a housing holding the first ferrule, and the first connecting portion is integrally formed with the housing.

7. The optical connector apparatus according to claim 1, wherein the first connector comprises a plug connector and the second connector comprises an adapter connector.

8. An optical connector apparatus comprising:
- a first connector having a first connecting portion adapted to be connected to and disconnected from a first connection object in a first direction;
- a second connector which has a second connecting portion adapted to be connected to a second connection object, and which is coupled to the first connector; and
- an optical fiber connected between the first and the second connectors;
- wherein the first connector includes a first ferrule having an end portion formed at a position corresponding to the first connecting portion and having a first outer diameter;
- wherein the second connector includes a second ferrule having an end portion formed at a position corresponding to the second connecting portion and having a second outer diameter greater than the first outer diameter;
- wherein the optical fiber is coupled to the first ferrule and the second ferrule;
- wherein the second connector further comprises a cylindrical housing and a holding member which is fixed in the cylindrical housing and holds the second ferrule; and
- wherein the first connector further comprises a housing holding the first ferrule and fitted to the cylindrical housing, and the first connecting portion is integrally formed with the housing of the first connector.

9. The optical connector apparatus according to claim 8, wherein the housing of the first connector is slidable with respect to the cylindrical housing in the first direction.

* * * * *